United States Patent
Suzuki (10) Patent No.: US 8,859,881 B2
(45) Date of Patent: Oct. 14, 2014

(54) SOLAR BATTERY MODULE

(75) Inventor: Issei Suzuki, Chiyoda-ku (JP)

(73) Assignee: Mitsubishi Electric Corporation, Chiyoda-Ku, Tokyo (JP)

(*) Notice: Subject to any disclaimer, the term of this patent is extended or adjusted under 35 U.S.C. 154(b) by 142 days.

(21) Appl. No.: 13/518,163

(22) PCT Filed: Feb. 2, 2010

(86) PCT No.: PCT/JP2010/051423
§ 371 (c)(1),
(2), (4) Date: Jun. 21, 2012

(87) PCT Pub. No.: WO2011/096044
PCT Pub. Date: Aug. 11, 2011

(65) Prior Publication Data
US 2012/0260976 A1    Oct. 18, 2012

(51) Int. Cl.
*H01L 31/048* (2014.01)
*H01L 31/042* (2014.01)
*F24J 2/46* (2006.01)

(52) U.S. Cl.
CPC ..... *H01L 31/0422* (2013.01); *F24J 2002/4656* (2013.01); *Y02E 10/52* (2013.01)
USPC .......................................... 136/244; 136/251

(58) Field of Classification Search
USPC ................................................ 136/244, 251
See application file for complete search history.

(56) References Cited

U.S. PATENT DOCUMENTS

2010/0132767 A1* 6/2010 Miyamoto et al. ............ 136/251
2011/0005581 A1  1/2011 Kanbara et al.

FOREIGN PATENT DOCUMENTS

| JP | 2004-006625 A | 1/2004 |
| JP | 2004-165556 A | 6/2004 |
| JP | 2009-141216 A | 6/2009 |
| WO | WO 2008/139609 A1 | 11/2008 |
| WO | WO 2009/107776 A1 | 9/2009 |

OTHER PUBLICATIONS

International Search Report (PCT/ISA/210) issued on Apr. 20, 2010, by the Japanese Patent Office as the International Searching Authority for International Application No. PCT/JP2010/051423.
Written Opinion (PCT/ISA/237) issued on Apr. 20, 2010, by the Japanese Patent Office as the International Searching Authority for International Application No. PCT/JP2010/051423.

* cited by examiner

*Primary Examiner* — Jonathan Johnson
*Assistant Examiner* — Christina Chern
(74) *Attorney, Agent, or Firm* — Buchanan Ingersoll & Rooney PC (57) ABSTRACT

A solar battery module comprises a solar battery panel that includes a transparent substrate and is constituted by laying out solar battery cells, a reinforcement frame placed on a back surface of the solar battery panel, and a buffer material arranged between the solar battery panel and the reinforcement frame. A second main surface of the buffer material opposing to the reinforcement frame is a flat surface and a notch is provided at a central part of a side of each of ends in a longitudinal direction of the reinforcement frame on a first main surface side, which opposes to the solar battery panel.

10 Claims, 6 Drawing Sheets

SOLAR BATTERY MODULE

FIELD

The present invention relates to a solar battery module that is installed on a building such as a house or a structure and that generates power by solar light.

BACKGROUND

There is a solar battery module having a configuration such that a transparent substrate (glass) is arranged on a light receiving side, a plurality of solar battery cells connected to each other serially or in parallel are arranged on a back surface side of the transparent substrate, these solar battery cells are sealed by a sealing resin, so that a solar battery panel is configured, and a frame is further mounted on a peripheral edge of the solar battery panel.

A solar battery module is generally installed on a building such as a house or a structure and is exposed to wind and rain. Because the solar battery module is a product used in such a severe environment, the strength with respect to a wind load or a snow load is one of indicators representing the product quality. In recent years, to reduce a price per unit output, a time required for a constructing operation, and a time required for a wiring operation, a solar battery module has been enlarged. Because of the enlargement, the withstand load performance of a solar battery panel, particularly that of a transparent substrate of the panel, is reduced.

A snow load by snow accumulated on a surface of the solar battery module acts thereon so as to press it vertically downward, so that the solar battery module deflects downward. To handle this problem, it is known to provide, in addition to frames surrounding four sides of a solar battery panel, a reinforcement frame that is placed on a back surface of the solar battery panel so as to be laid between the frames for supporting the solar battery panel from the back surface. According to such a configuration, a decrease in deformation amount of a transparent substrate when a load is applied thereto can be expected.

In addition, according to the solar battery module having the reinforcement frame mentioned above on a back surface of a panel, in order to further prevent wear of a back sheet and breakage of cells caused by collision and friction of the back surface of the panel with the reinforcement frame, a buffer material is mounted on the back surface of the panel. Because of such a configuration, the back surface of the module does not contact the reinforcement frame directly, and thus breakage and wear of the back surface of the module can be prevented (see, for example, Patent Literature 1).

CITATION LIST

Patent Literatures

Patent Literature 1: Japanese Patent Application Laid-open No. 2004-6625
Patent Literature 2: International Publication No. WO 2008/139609

SUMMARY

Technical Problem

However, because the buffer material proposed in Patent Literature 1 is an elastic body, when a load on a module is increased, a reinforcement frame sinks into the buffer material and the module contacts the reinforcement frame at a portion where the buffer material is not arranged, and thus improvements for this problem have been desired. Furthermore, because the buffer material made of an elastic body may be worn by repeated friction with the reinforcement frame because of a vibration load such as a wind pressure, improvements for this problem have been desired.

To solve the above problems, there is a solar battery module proposed in Patent Literature 2 that includes a buffer material made of a hard material. However, because a simple rectangular-parallelepiped buffer material made of a hard material is inserted between a substantially rigid solar-battery panel and a reinforcement frame, a local stress occasionally concentrates on an end of the buffer material. When this concentration of the local stress is generated, a layer of the solar battery panel, particularly a layer made of glass, may be broken, which causes a decrease in the withstand load of the module. Accordingly, improvements for this problem have been desired.

The present invention has been achieved in view of the above problems, and an object of the present invention is to provide a solar battery module that can relax the concentration of a local stress generated at an end of a buffer material, and to suppress breakage of a layer (a transparent substrate) of a solar battery panel, particularly a layer made of glass, thereby achieving improvements on a decrease in the withstand load of a module.

Solution to Problem

In order to solve the aforementioned problems and attain the aforementioned object, a first solar battery module of the present invention is provided with: a solar battery panel that includes a transparent substrate and is constituted by laying out solar battery cells; a reinforcement frame placed on a back surface of the solar battery panel; and a buffer material arranged between the solar battery panel and the reinforcement frame, wherein the buffer material is constituted such that a second main surface thereof opposing to the reinforcement frame is a flat surface and a notch is respectively provided at at least a central part of a side of each of ends in a longitudinal direction of the reinforcement frame on a first main surface side, which opposes to the solar battery panel.

Further, a second solar battery module of the present invention is provided with: a solar battery panel that includes a transparent substrate and is constituted by laying out solar battery cells; a reinforcement frame placed on a back surface of the solar battery panel; and a buffer material arranged between the solar battery panel and the reinforcement frame, wherein the buffer material includes two flat plate parts laid out in a length direction of the reinforcement frame, and a coupling unit that couples the two flat plate parts to each other, and the coupling unit couples the two flat plate parts so that the two flat plate parts are bent from a state of being flush along a surface of the solar battery panel so as to be convex toward a side of the reinforcement frame while centering around the coupling unit and are not bent toward a side of the solar battery panel and maintained to be flush.

Advantageous Effects of Invention

According to the solar battery module of the present invention, buffer materials have a specific shape and relax the concentration of a local stress generated between a solar battery panel and a buffer material. Accordingly, breakage of a layer of the solar battery panel, particularly a layer made of glass, can be suppressed, thereby achieving improvements on a decrease in the withstand load of a module.

DESCRIPTION OF EMBODIMENTS

Exemplary embodiments of a solar battery module according to the present invention will be explained below in detail with reference to the accompanying drawings. The present invention is not limited to the embodiments.

Figure 1:
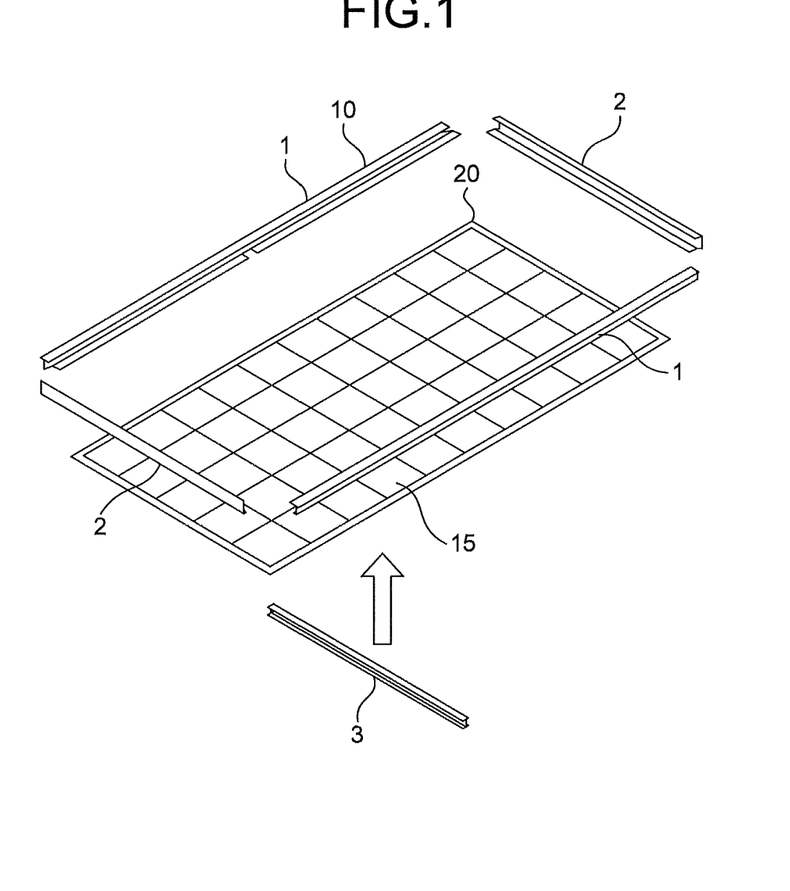
FIG. 1 is a perspective view of a state of an initial step of assembling a solar battery module according to the present invention.
Figure 2:
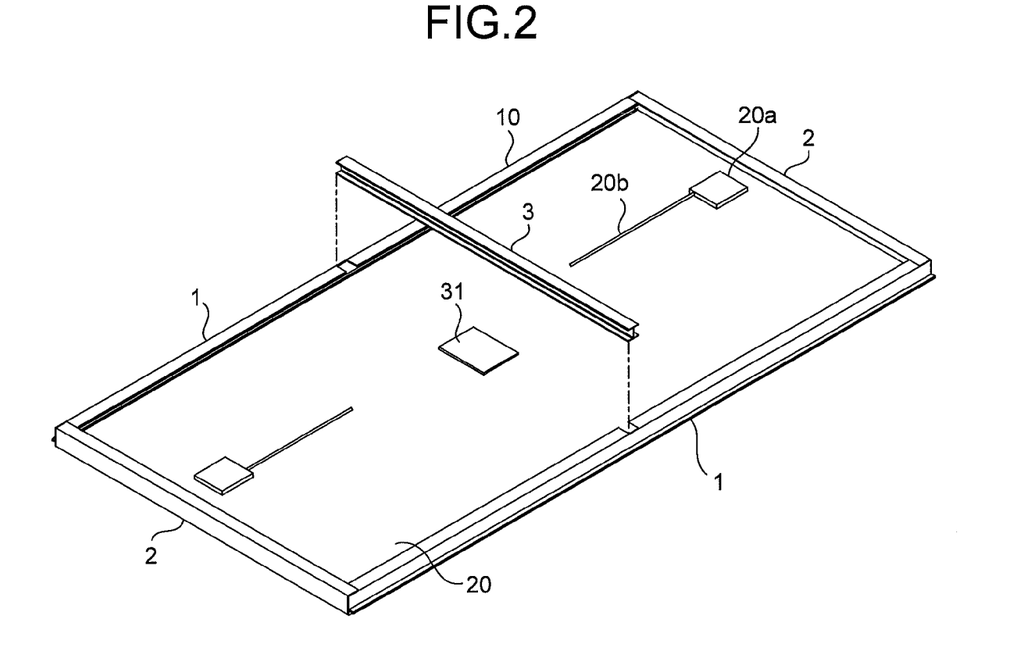
FIG. 2 is a perspective view of a state where a reinforcement frame is mounted on an intermediate assembly with a casing-shaped frame being mounted on an outer edge part of a solar battery panel from a back surface.
Figure 3:
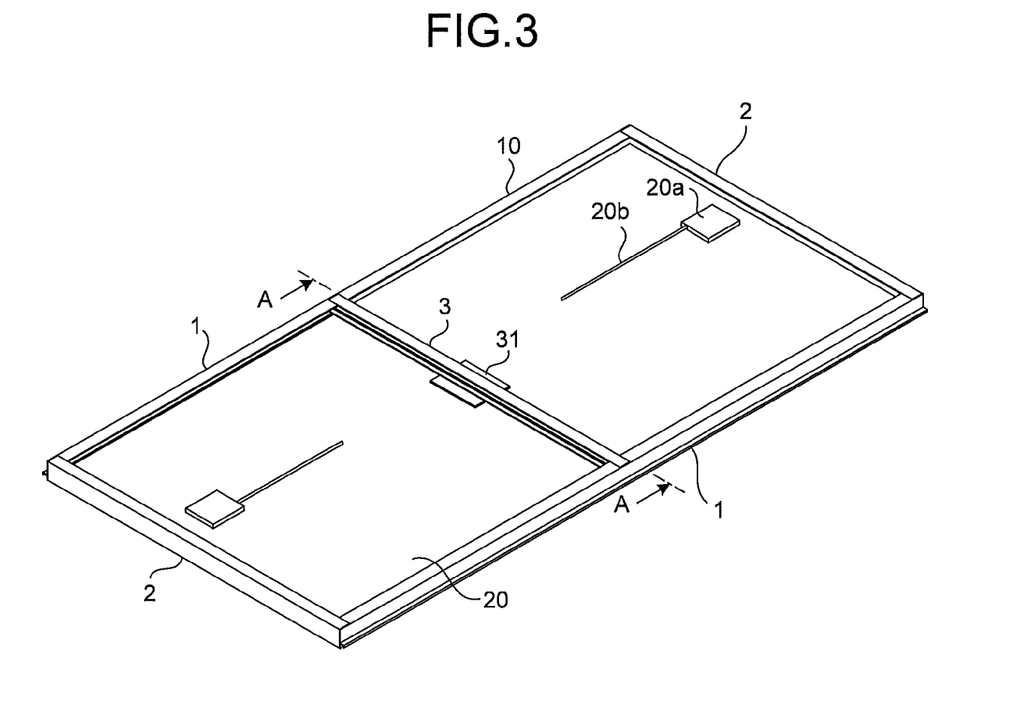
FIG. 3 is a perspective view of a state where mounting of the reinforcement frame on the intermediate assembly has been completed.

FIG. 1 is a perspective view of a state of an initial step of assembling a solar battery module according to the present invention. FIG. 2 is a perspective view of a state where a reinforcement frame is mounted on an intermediate assembly with a casing-shaped frame being mounted on an outer edge part of a solar battery panel from a back surface. FIG. 3 is a perspective view of a state where mounting of the reinforcement frame on the intermediate assembly has been completed.

The solar battery module includes a substantially rectangular flat-plate-shaped solar battery panel 20, a buffer material 31 fixed to a back surface of the solar battery panel 20, a casing-shaped frame 10 that has a rectangular casing shape and surrounds the entire outer edge part of the solar battery panel 20, and a reinforcement frame 3 mounted on the casing-shaped frame 10. The buffer material 31 is fixed to a position where the buffer material 31 is sandwiched between the solar battery panel 20 and the reinforcement frame 3.

As shown in FIG. 1, the solar battery panel 20 is configured by laying out a plurality of solar battery cells 15 vertically and horizontally to have a substantially rectangular flat-plate shape. The casing-shaped frame 10 is configured by a pair of opposing long side frames 1, 1 and a pair of short side frames 2, 2 coupled between ends of the long side frames 1, 1. The pair of long side frames 1, 1 and the pair of short side frames 2, 2 are coupled to each other, so that the casing-shaped frame 10 having a rectangular casing shape is formed.

As shown in FIG. 2, the buffer material 31 is made of a hard material such as aluminum or hard resin, formed in a substantially flat-plate shape, and fixed to the back surface of the solar battery panel 20. A notch into which the reinforcement frame 3 is fitted is provided at a back-surface central part of each of the long side frames 1, 1. Ends of the reinforcement frame 3 are put into these fitting notches from a side of the back surface, so that the reinforcement frame 3 is incorporated into the long side frames 1, 1. A terminal box 20a and a cable 20b extending from the terminal box 20a are provided on the back surface of the solar battery panel 20.

As shown in FIG. 3, the reinforcement frame 3 is laid between the opposing long side frames 1, 1 of the casing-shaped frame 10 to be mounted on the casing-shaped frame 10. The reinforcement frame 3 is mounted on a position where the reinforcement frame 3 sandwiches the buffer material 31 with the solar battery panel 20. While the buffer material 31 is arranged so as to be sandwiched between the solar battery panel 20 and the reinforcement frame 3, the buffer material 31 does not shift or fall off because it is fixed to the back surface of the solar battery panel 20.

Figure 4:
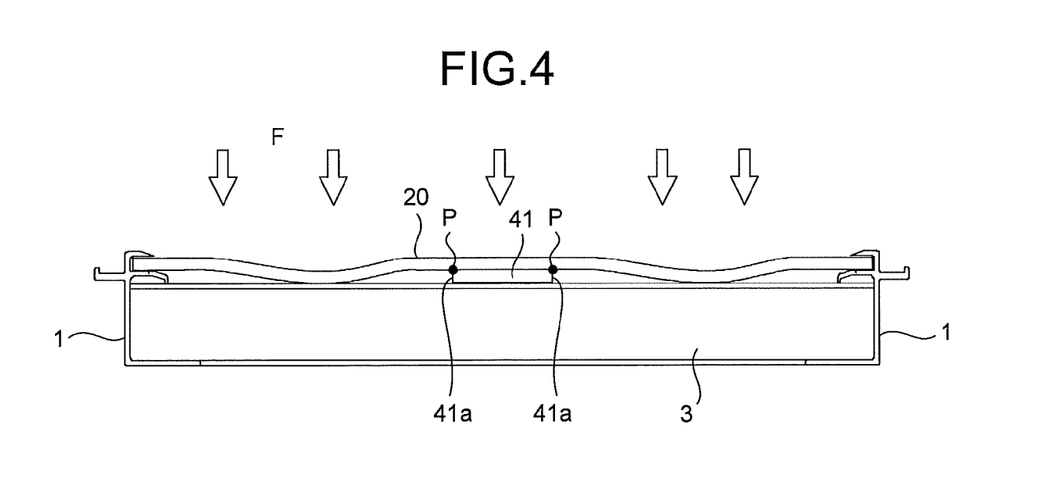
FIG. 4 represents an arrow cross-section along a line A-A of FIG. 3, and is an explanatory diagram of a state where a point of action of a snow load matches a point of action of a reaction force of a reinforcement frame in a solar battery module having a conventional buffer material.

FIG. 4 represents an arrow cross-section along a line A-A of FIG. 3, and is a diagram for explaining again problems in a conventional configuration, in which a state where a point of action of a snow load matches a point of action of a reaction force of a reinforcement frame in a solar battery module having a conventional buffer material is shown. With reference to FIG. 4, according to a conventional solar battery module, a simple rectangular-parallelepiped buffer material 41 is placed between the solar battery panel 20 and the reinforcement frame 3.

For example, when snow is accumulated on the entire surface of the solar battery panel 20 and the snow acts on the solar battery panel 20 as a snow load F, the entire solar battery panel 20 deflects. At this time, because four sides surrounding the solar battery panel 20 are supported by the casing-shaped frame 10 and its central part is supported by the buffer material 41 and thus their positions are not changed, other parts are deformed so as to sink in. Accordingly, when the buffer material 41 has a simple rectangular-parallelepiped shape, a local stress concentrates on an end surface part of the buffer material 41. Specifically, the local stress concentrates on a side of a longitudinal-direction end surface 41a of the buffer material 41 on a side of the solar battery panel 20 (more specifically, a central part of this side). Consequently, a layer of the solar battery panel 20, particularly a layer made of glass, is occasionally broken at a local-stress concentration point P.

First Embodiment

Figure 5:
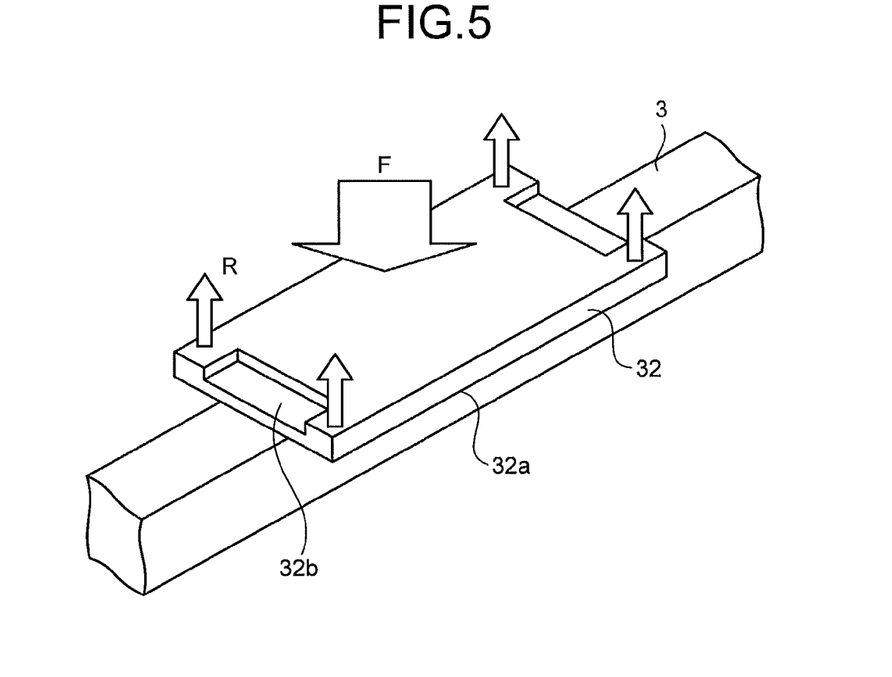
FIG. 5 is a perspective view of a state where a buffer material of a solar battery module according to a first embodiment of the present invention is arranged so as to be sandwiched between a solar battery panel and a reinforcement frame.

FIG. 5 is a perspective view of a state where a buffer material of a solar battery module according to a first embodiment of the present invention is arranged so as to be sandwiched between a solar battery panel and a reinforcement frame, and is a schematic diagram of a state where a reaction force from a reinforcement frame side is dispersed by the buffer material according to the present embodiment. A buffer material 32 according to the present embodiment is formed in a substantially rectangular-parallelepiped flat-plate shape and its second main surface opposing to the reinforcement frame 3 is a flat surface 32a. A notch 32b is provided at a central part of a side of each of both ends of the buffer material 32 in a longitudinal direction of the reinforcement frame 3 opposing to the solar battery panel 20 side. In other words, the notch 32b is provided at central parts of respective sides of end surfaces of the buffer material 32 in the longitudinal direction of the reinforcement frame 3 opposing to the solar battery panel 20 side. That is, the notch 32b is provided at the central parts of the respective sides of end surfaces of the buffer material 32 in the longitudinal direction of the reinforcement frame 3 opposing to the solar battery panel 20 side where the local-stress concentration point P (FIG. 4) is present in a conventional technique.

According to the buffer material 32 with the above configuration, the notch 32b is provided at the central part of the side where the local-stress concentration point P is present in a conventional technique. That is, there is no buffer material in that part. When a stress F acts on the buffer material 32, an end where the local-stress concentration point P is present in a conventional technique slightly moves toward a side of the notch 32b. Therefore, a reaction force R from a side of the reinforcement frame 3 concentrated on the local-stress concentration point is dispersed in a direction of short-side direction ends as shown in FIG. 5. With this configuration, damage of the solar battery panel 20 is suppressed.

The notch 32b is effective when it is provided at at least the central parts of the respective sides of end surfaces in the longitudinal direction of the reinforcement frame 3 on the side of the solar battery panel 20. Substantially the same effects can be achieved when the notch is provided over the entire side of an end surface on the side of the solar battery panel 20. However, when the notch 32b is made to be excessively large, the contact area of the buffer material 32 and the solar battery panel 20 is reduced and only an effect of using a small buffer material is achieved.

Second Embodiment

Figure 6:
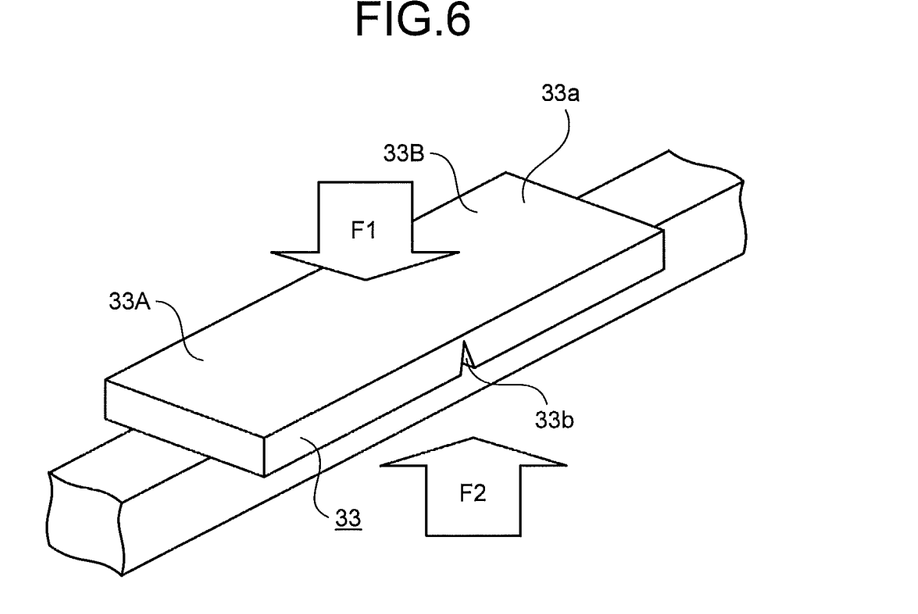
FIG. 6 is a perspective view of a buffer material of a solar battery module according to a second embodiment of the present invention.
Figure 7:
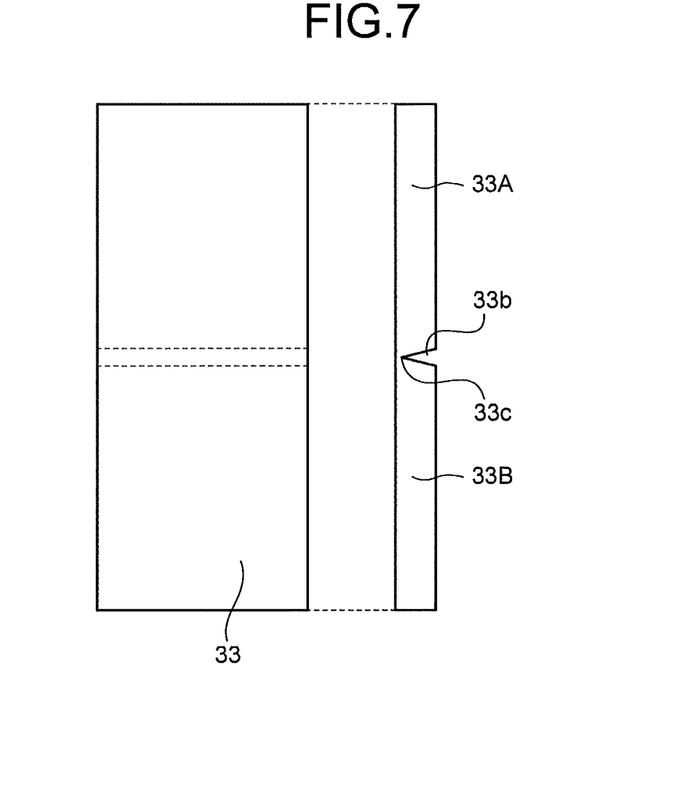
FIG. 7 depicts a state of the buffer material according to the second embodiment as viewed from two directions.

FIG. 6 is a perspective view of a state where a buffer material of a solar battery module according to a second embodiment of the present invention is arranged so as to be sandwiched between a solar battery panel and a reinforcement frame. FIG. 7 depicts a state of the buffer material according to the second embodiment as viewed from two directions. A buffer material 33 according to the present embodiment is formed in a substantially rectangular-parallelepiped flat-plate shape and its first main surface opposing to the solar battery panel 20 is a flat surface 33a. A cut groove 33b extending in a direction orthogonal to the reinforcement frame 3 is provided at a longitudinal-direction central part of a second main surface of the buffer material 33 opposing to the reinforcement frame 3 so as to be across its entire width. The cut groove 33b is cut from a second main surface side so that its cross-section is formed in a wedge shape. A thin wall part 33c is then formed between the cut groove 33b and the first main surface. The thin wall part 33c constitutes a coupling unit that couples two flat plate parts 33A and 33B.

As explained above, the buffer material 33 according to the present embodiment has the two flat plate parts 33A and 33B laid out in a length direction of the reinforcement frame 3 and the thin wall part 33c (the coupling unit) that couples the two flat plate parts 33A and 33B. The thin wall part 33c couples the two flat plate parts 33A and 33B to each other so that the two flat plate parts are bent from a state of being flush on a plane along a main surface of the solar battery panel 20 into an L-shaped cross section that is convex toward the side of the reinforcement frame 3 with the thin wall part 33c serving as a rotating axis. While the thin wall part 33c bends the two flat plate parts 33A and 33B so that the flat plate parts are convex toward the side of the reinforcement frame 3, it does not bend them toward the side of the solar battery panel 20 and maintains the two flat plate parts 33A and 33B to be flush on a plane parallel to the solar battery panel 20.

According to the solar battery module with such a configuration, when a pressing force F1 (FIG. 6), such as a snow load, is applied from the side of the solar battery panel 20, the buffer material 33 is gently bent so as to follow a curve of the solar battery panel 20 under loading, thereby relaxing the concentration of a stress with the reinforcement frame 3. Consequently, damage of the solar battery panel 20 can be reduced.

Meanwhile, when a pressing force F2, which is mainly a wind pressure load, is applied to the side of the solar battery panel 20, the buffer material 33 according to the present embodiment does not bend and maintains the state of being flush because the cut groove 33b has a directionality. That is, for the curve of the solar battery panel 20, the buffer material 33 acts so as to suppress its displacement. With this configuration, the buffer material 33 serves as a reinforcement frame that supports the solar battery panel 20, and effects of suppressing the displacement of the solar battery panel 20 and of preventing the solar battery cells 15 within the solar battery panel from being broken can be also achieved.

Furthermore, by configuring the coupling unit that bends toward the side of the reinforcement frame 3 but does not bend toward the side of the solar battery panel 20 by the cut groove 33b and the thin wall part 33c as in the present embodiment, the configuration can be simple and inexpensive.

Third Embodiment

Figure 8:
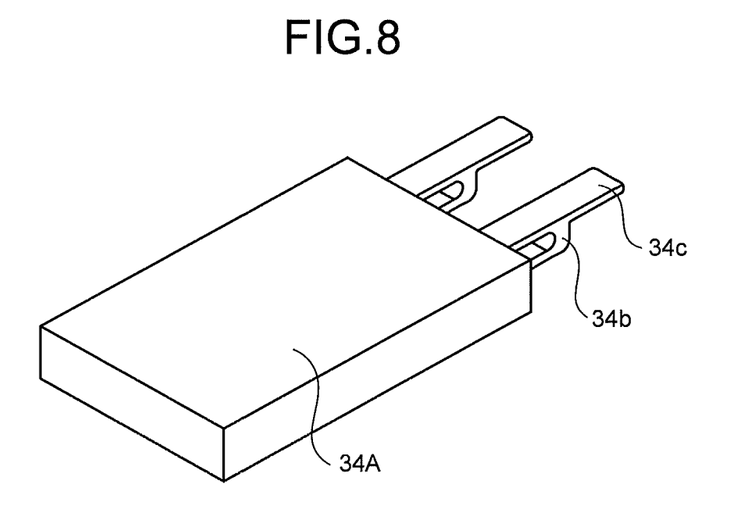
FIG. 8 is a perspective view of a first flat plate part of a solar battery module according to a third embodiment of the present invention.
Figure 9:
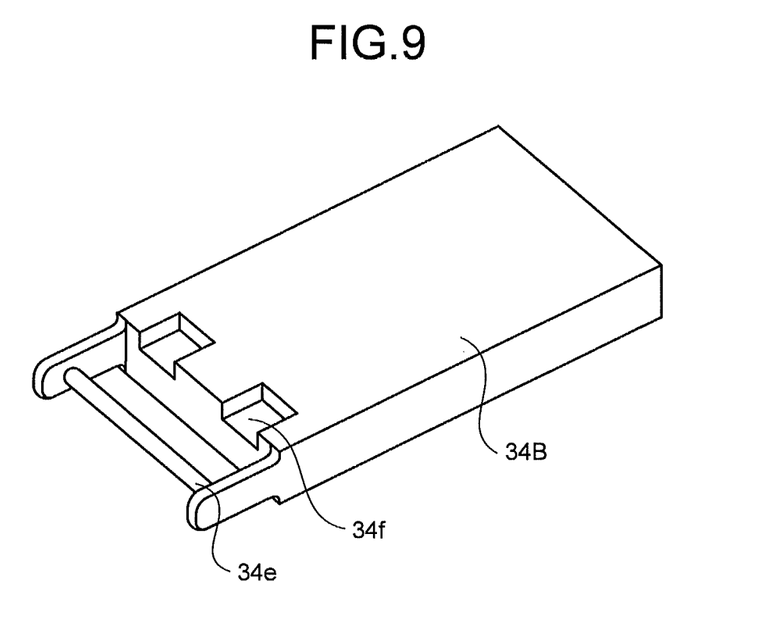
FIG. 9 is a perspective view of a second flat plate part of the solar battery module according to the third embodiment of the present invention.

FIG. 8 is a perspective view of a first flat plate part 34A of a solar battery module according to a third embodiment of the present invention. FIG. 9 is a perspective view of a second flat plate part 34B, coupled to the first flat plate part 34A of FIG. 8, of the solar battery module according to the third embodiment of the present invention. The first flat plate part 34A and the second flat plate part 34B are formed in a substantially rectangular-parallelepiped flat-plate shape. The first flat plate part 34A and the second flat plate part 34B can be easily coupled and separated to and from each other by a hinge structure constituted by a shaft part 34e that has a circular cross-section and extends in a direction orthogonal to the reinforcement frame 3 and a substantially U-shaped engaging part 34b that rotatably engages with the shaft part 34e at the respective longitudinal-direction ends.

Figure 10:
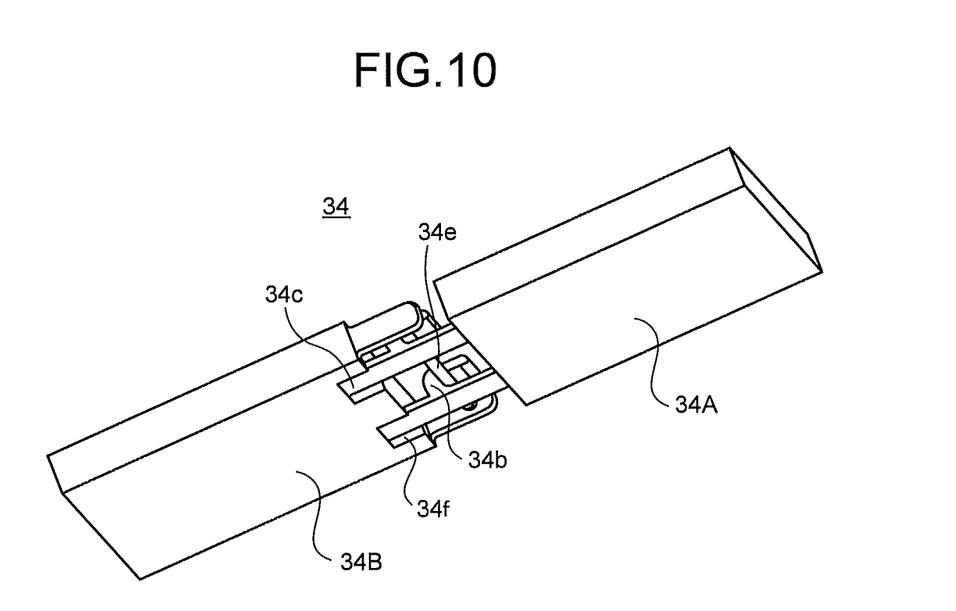
FIG. 10 is a perspective view of a state where the first flat plate part and the second flat plate part are coupled to each other.
Figure 11:
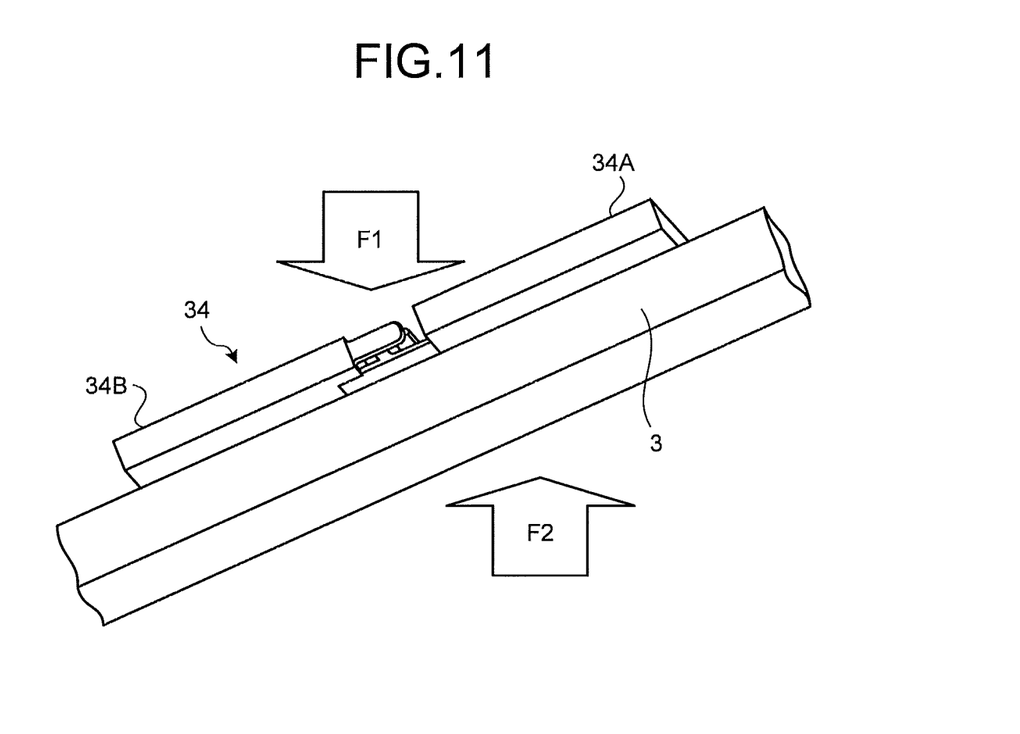
FIG. 11 is a perspective view of a state where the first flat plate part and the second flat plate part are arranged so as to be sandwiched between a solar battery panel and a reinforcement frame.

FIG. 10 is a perspective view of a state where the first flat plate part 34A described above and the second flat plate part 34B described above are coupled to each other. FIG. 11 is a perspective view of a state where the first flat plate part 34A and the second flat plate part 34B are arranged so as to be sandwiched between the solar battery panel 20 (not shown in FIG. 11) and the reinforcement frame 3. A buffer material 34 with such a configuration can be easily bent with a transverse-direction hinge part serving as a central axis when a pressing force F is loaded, and the same effects of relaxing the concentration of a stress like in the second embodiment can be achieved.

Because a protruding part 34c of the first flat plate part 34A and a groove part 34f of the second flat plate part 34B buffer each other, when the pressing force F2 is loaded in a different direction, the buffer material 34 is not bent toward the side of the solar battery panel 20, and an effect of suppressing the curve of the solar battery panel 20 can be also achieved like in the second embodiment.

According to the solar battery module of the present embodiment, as explained above, the concentration of a local stress generated between the solar battery panel 20 and the buffer material 34 is relaxed. Breakage of a layer of the solar battery panel 20, particularly that a layer of glass, can be suppressed, thereby achieving improvements on a decrease in the withstand load of the module.

As for the buffer materials 32, 33, and 34 according to the first to third embodiments, while a single buffer material is provided between the solar battery panel 20 and the reinforcement frame 3, a plurality of the buffer materials 32, 33, and 34 can be placed in the length direction of the reinforcement frame 3. For example, the buffer materials 32, 33, and 34 are placed in the length direction of the reinforcement frame 3 at a predetermined interval therebetween. Furthermore, the buffer materials 34 can be coupled to each other and placed by providing a hinge structure at ends of the buffer material 34. By the arrangement of the hinge structure, distortion of the solar battery panel 20 can be further reduced and contact of the solar battery panel 20 with the reinforcement frame 3 can be prevented. Therefore, damage of the solar battery panel 20 can be prevented more reliably.

INDUSTRIAL APPLICABILITY

As described above, the solar battery module according to the present invention is useful for a solar battery module installed on a building such as a house or a structure, and is particularly suitable for a solar battery module installed in an area with heavy snowfalls or an area with severe wind and rain.

REFERENCE SIGNS LIST

1 LONG SIDE FRAME
2 SHORT SIDE FRAME
3 REINFORCEMENT FRAME
10 CASING-SHAPED FRAME
15 SOLAR BATTERY CELL
20 SOLAR BATTERY PANEL
20a TERMINAL BOX
20b CABLE
31, 32, 33, 34 BUFFER MATERIAL
32a, 33a FLAT SURFACE
33A, 33B FLAT PLATE PART
33b CUT GROOVE (COUPLING UNIT)
33c THIN WALL PART (COUPLING UNIT)
34A, 34B FLAT PLATE PART
34b ENGAGING PART (HINGE STRUCTURE)
34e SHAFT PART (HINGE STRUCTURE)
34c PROTRUDING PART
34f GROOVE PART
41 CONVENTIONAL BUFFER MATERIAL
41a END SURFACE
P LOCAL-STRESS CONCENTRATION POINT

The invention claimed is:

1. A solar battery module comprising:
a solar battery panel that includes a transparent substrate and is constituted by laying out solar battery cells;
a reinforcement frame placed on a back surface of the solar battery panel; and
a buffer material arranged between the solar battery panel and the reinforcement frame, wherein
the buffer material is constituted such that one main surface thereof, which opposes the reinforcement frame, is a flat surface, and the other main surface thereof, which opposes the solar battery panel, has a notch at least at a central part of each of both ends of the buffer material in a longitudinal direction of the reinforcement frame, to provide the buffer material with a thickness in the area of each notch that is less than the thickness of the remaining area of the buffer material.

2. The solar battery module according to claim 1, wherein the notch is provided only at said central part of each of both ends in the longitudinal direction of the reinforcement frame on the other main surface side, which opposes the solar battery panel.

3. The solar battery module according to claim 1, wherein the buffer material is fixed to a back surface of the solar battery module.

4. The solar battery module according to claim 1, wherein a plurality of the buffer materials are placed in a length direction of the reinforcement frame.

5. A solar battery module comprising:
a solar battery panel that includes a transparent substrate and is constituted by laying out solar battery cells;
a reinforcement frame placed on a back surface of the solar battery panel; and
a buffer material arranged between the solar battery panel and the reinforcement frame, wherein
the buffer material has a first outermost surface that opposes the reinforcement frame, and a second outermost surface that opposes the solar battery panel, and wherein a recess is disposed in the second outermost surface, at least at both ends of the buffer material in a longitudinal direction of the reinforcement frame, such that the area of the second outermost surface that opposes the solar battery panel is less than the area of the first outermost surface that opposes the reinforcement frame.

6. The solar battery module of claim 5, wherein the recess is located at a central portion of each of said ends of the buffer material.

7. The solar battery module of claim 6, wherein each recess has a width that is less than the total width of the buffer material at each of said ends.

8. A solar battery module comprising:
a solar battery panel that includes a transparent substrate and is constituted by laying out solar battery cells;
a reinforcement frame placed on a back surface of the solar battery panel; and
a buffer material arranged between the solar battery panel and the reinforcement frame, wherein
the buffer material has a substantially uniform thickness throughout a majority of its volume, and has a recess disposed in the material at a surface that opposes the solar battery panel, at least at both ends of the buffer material in a longitudinal direction of the reinforcement frame, such that the thickness of the buffer material in the region of each recess is less than said uniform thickness.

9. The solar battery module of claim 8, wherein the recess is located at a central portion of each of said ends of the buffer material.

10. The solar battery module of claim 9, wherein each recess has a width that is less than the total width of the buffer material at each of said ends.

* * * * *